United States Patent
Sun

(10) Patent No.: US 9,178,795 B2
(45) Date of Patent: Nov. 3, 2015

(54) METHOD AND ETHERNET SWITCHING DEVICE FOR DETECTING LOOP POSITION IN ETHERNET

(71) Applicant: Huawei Technologies Co., Ltd., Shenzhen, Guangdong (CN)

(72) Inventor: Shengtao Sun, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 100 days.

(21) Appl. No.: 14/109,802

(22) Filed: Dec. 17, 2013

(65) Prior Publication Data

US 2014/0105034 A1  Apr. 17, 2014

Related U.S. Application Data

(63) Continuation of application No. PCT/CN2011/075860, filed on Jun. 17, 2011.

(51) Int. Cl.
| | |
|---|---|
| *G01R 31/08* | (2006.01) |
| *H04L 12/26* | (2006.01) |
| *H04L 12/46* | (2006.01) |
| *H04L 12/42* | (2006.01) |
| *H04L 12/705* | (2013.01) |
| *H04L 12/24* | (2006.01) |

(52) U.S. Cl.
CPC ............... *H04L 43/50* (2013.01); *H04L 12/42* (2013.01); *H04L 12/462* (2013.01); *H04L 45/18* (2013.01); *H04L 41/0654* (2013.01)

(58) Field of Classification Search
CPC ............ H04I 43/00; H04I 43/08; H04I 43/16; H04I 43/50; H04I 12/00; H04I 12/42; H04I 12/46; H04I 12/54; H04I 45/00; H04I 45/08; H04I 45/18

See application file for complete search history.

(56) References Cited

U.S. PATENT DOCUMENTS

| | | | |
|---|---|---|---|
| 7,843,854 B2 | 11/2010 | Vanzante | |
| 2007/0118595 A1 | 5/2007 | Jain et al. | |
| 2007/0253346 A1 | 11/2007 | Nguyen et al. | |
| 2009/0207742 A1* | 8/2009 | Suzuyama et al. | 370/249 |
| 2009/0282145 A1* | 11/2009 | Niimi | 709/224 |
| 2009/0323518 A1* | 12/2009 | Rose et al. | 370/223 |

FOREIGN PATENT DOCUMENTS

| | | |
|---|---|---|
| CN | 101005412 A | 7/2007 |
| CN | 101102236 A | 1/2008 |
| CN | 101212366 A | 7/2008 |

(Continued)

*Primary Examiner* — Anh Ngoc Nguyen
(74) *Attorney, Agent, or Firm* — Leydig, Voit & Mayer, Ltd.

(57) ABSTRACT

A method for detecting loop position in an Ethernet network, includes: the Ethernet switch device learns a MAC address; in a MAC table, a first MAC address corresponds to a first port before the learning of MAC address, and the first MAC address corresponds to a second port after the learning of MAC address; if the second port and the first port do not belong to the same sub-network, an interval between a time of learning on the second port and a time of transmitting a last packet or receiving a last packet from the first port is calculated; and if the interval is smaller than a predetermined judgment threshold of host migration, it is determined that a loop exists in a sub-network connected to the second port.

9 Claims, 6 Drawing Sheets

---

S301 — the Ethernet switch device learns a MAC address; in a MAC table, a first MAC address corresponds to a first port before learning of MAC address, and the first MAC address corresponds to a second port after learning of MAC address.

S302 — If the second port and the first port do not belong to the same sub-network, an interval between a time of learning on the second port and a time of transmitting late packet or receiving late packet from the first port is calculated.

S303 — If the interval is smaller than a predetermined judgment threshold of host migration, it is determined that a loop exists in a sub-network connected to the second port.

(56) References Cited

FOREIGN PATENT DOCUMENTS

| | | | |
|---|---|---|---|
| CN | 101405976 A | 4/2009 |
| CN | 101432721 A | 5/2009 |
| EP | 1958079 A2 | 8/2008 |
| EP | 1976195 A1 | 10/2008 |
| WO | WO 2007067746 A2 | 6/2007 |

* cited by examiner

METHOD AND ETHERNET SWITCHING DEVICE FOR DETECTING LOOP POSITION IN ETHERNET

CROSS REFERENCE

This application is a continuation of International Patent Application No. PCT/CN2011/075860, filed on Jun. 17, 2011, which is hereby incorporated by reference in its entirety.

TECHNICAL FIELD

The present application relates to a field of communications, more particularly, to a method and an Ethernet switch device for detecting loop position in Ethernet.

BACKGROUND

Ethernet is currently the most widely-used communication standard of local area network and is gradually becoming the mainstream in wide area network technology.

In a large scale Ethernet, Ethernet switches are generally used to interconnect a plurality of Ethernets, as the effective transmission distance is limited.

In broadcast and multicast communications, the Ethernet switch has to ensure that a packet received at a port will not be transmitted out of the port received the packet; otherwise a broadcast storm will be caused. As illustrated in FIG. 1, an Ethernet switch A 11 is connected to an Ethernet switch B 12 and an Ethernet switch C 13 respectively. When a connection is established between the Ethernet switch B 12 and the Ethernet switch C 13, a loop is formed between the Ethernet switches A, B and C. Assuming a network connected to the Ethernet switch A 11 transmits a broadcast packet, the packet will be broadcasted to the Ethernet switches B 12 and C 13 by the Ethernet switch A 11. Upon receiving the packet, the Ethernet switch B 12 will broadcast the packet to networks connected thereto and the Ethernet switch C 13. The Ethernet switch C 13 will therefore receive repetitive packets. For the packet transmitted from the Ethernet switch A 11, the Ethernet switch C 13 will broadcast it to networks connected thereto and the Ethernet switch A 11. The Ethernet switch B 12 will again broadcast the received packet to the networks connected thereto and the Ethernet switch A 11. The process is repeated in such a way that a broadcast storm will be formed in the network.

As a result, the issue of Ethernet loop has always been of much concern for those skilled in the art. To reduce the risk of forming a loop, a STP (Spanning Tree Protocol) is generally deployed in the network. The basic concept of STP is to spread neighboring connections information acquired by each node across the network. All nodes in the whole network build up the network topology according to the information, and decide which links are working under redundant or backup state and therefore would not participate in packet forwarding, according to predetermined rules. In the case of determining that a certain link is faulty, it recalculates, according to the rules, which redundant or backup links will recover the active state and resume packet forwarding.

Conventional methods for loop detection mainly involve transmitting a special packet on a port of a device and then detecting whether the packet can be received from this port. The detection takes relatively long time as it requires operations, such as associated hand-shake protocols between devices. Furthermore, the conventional methods can only determine the existence of loop in the network while not able to determine in which part of the network the loop exists.

SUMMARY

To solve the problem that the exact position of the loop cannot be located rapidly when a loop exists, embodiments of the present application provide a method and an Ethernet switch device for loop position detection in an Ethernet.

To achieve the above objective, the embodiments of the present application include the following technical solutions.

One aspect of the application provides a method for detecting a loop position in an Ethernet, comprising:
learning a MAC (Media Access Control) address by an Ethernet switch device; in a MAC table, a first MAC address corresponds to a first port before the learning of MAC address, and the first MAC address corresponds to a second port after the learning of MAC address;
calculating an interval between a time of learning on the second port and a time of transmitting a last packet or receiving a last packet from the first port, if the second port and the first port do not belong to the same sub-network
determining that a loop exists in a sub-network connected to the second port, if the interval is smaller than a predetermined judgment threshold of host migration.

Another aspect of the application provides an Ethernet switch device, comprising:
a MAC address learning unit, configured to learn a media access control MAC address; in a MAC table, a first MAC address corresponds to a first port before the learning of MAC address, and the first MAC address corresponds to a second port after the learning of MAC address;
a calculation unit, configured to calculate an interval between a time of learning on the second port and a time of transmitting a last packet or receiving a last packet from the first port, if the second port and the first port are not in the same sub-network; and
a determination unit, configured to determine that a loop exists in a sub-network connected to the second port, if the interval is smaller than a predetermined judgment threshold of host migration.

According to the method and the Ethernet switch device for detecting the loop position in the Ethernet which are provided by embodiments of the present application, if the second port and the first port which correspond to the same MAC address are not in the same network after learning the MAC address, the interval between the time of learning on the second port and the time of transmitting a last packet or receiving a last packet from the first port is calculated. If the interval is smaller than the predetermined judgment threshold of host migration, it is determined that the loop exists in a sub-network connected to the second port. In this way, the loop detection time in the Ethernet can be significantly reduced and the position of loop can be rapidly determined, thereby reducing the impact of the loop on regular traffic to the minimum extent.

BRIEF DESCRIPTION OF THE DRAWINGS

In order to clearly illustrate technical solutions of the embodiments of the application or prior arts, drawings of the embodiments or prior arts will be briefly described in the following. It is obvious that the drawings merely illustrate some embodiments of the present application and those FIG. 1 schematically shows a network loop.

DETAILED DESCRIPTION

The technical solutions of the embodiments will be described in a clearly and fully understandable way with reference to the drawings related to the embodiments of the present application. It is obvious that the described embodiments are just a part but not all of the embodiments of the present application. Based on the described embodiments herein, those skilled in the art can obtain other embodiments, without any inventive work, which also should be within the scope of the present application.

Some terms used in the embodiments of the application will be explained with reference to FIG. 2, which is a typical networking scheme of Ethernet switch devices. In the embodiments, the Ethernet switch devices are not limited to specific products; instead, the Ethernet switch devices may be all devices performing Ethernet switching functions, including an Ethernet switch, a layer 3 switch, a VPLS (Virtual Private LAN service) device and the like.

Loop Port Set

From the viewpoint of an Ethernet switch device, due to the existence of the network loop, a broadcast packet transmitted from a certain port X of the Ethernet switch device may be received on another port Y of this Ethernet switch device. In this sense, the ports X and Y both belong to one "loop port set".

One port belongs to only one "loop port set", and the loop port set may include only one port. Herein, the term "port" is not limited to a real physical port of a switch device and may include a logical port, such as a VLAN (Virtual Local Area Network) in a physical port or one PW (Pseudo Wire) in a VPLS network.

Figure 1:
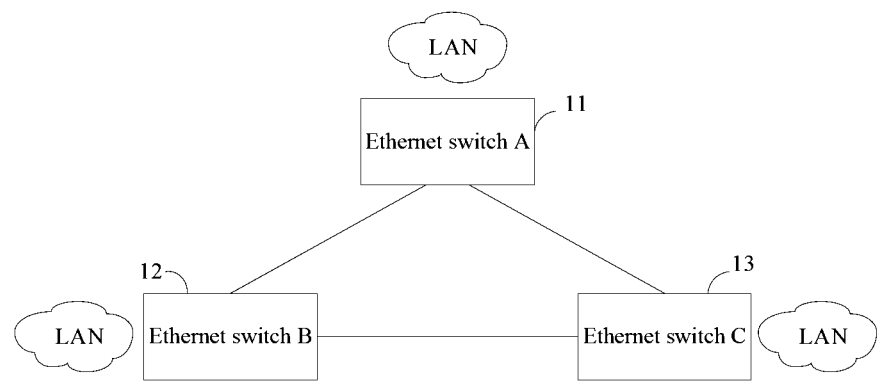
Figure 2:
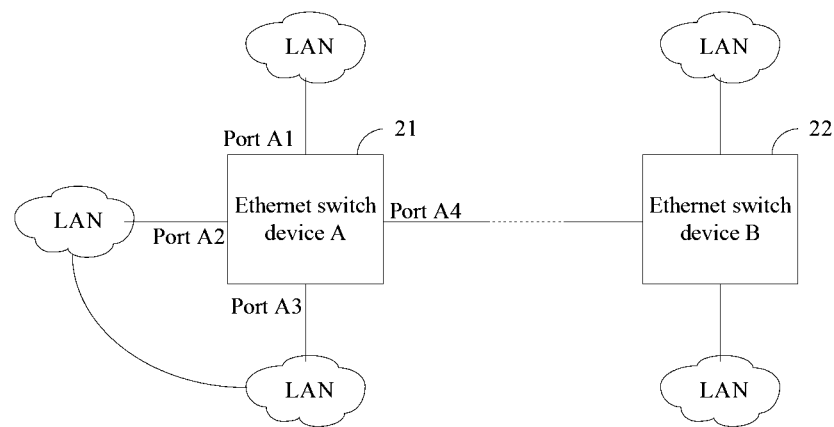
FIG. 2 schematically shows networking scheme of Ethernet switch devices.

As shown in FIG. 2, the Ethernet switch device A 21 has four ports in total, i.e. port A1, port A2, port A3 and port A4. If a broadcast packet transmitted from port A2 may be received on port A3, then ports A2 and A3 are defined as belonging to one "loop port set".

Sub-Network

In the embodiments of the application, all of switch devices and hosts connected to one "loop port set" form one "sub-network".

MAC Address Learning

In an Ethernet switch device, "MAC address learning" indicates that a MAC table exists in the Ethernet switch device, and the MAC table includes corresponding relationships between MAC addresses and ports of the switch device. When the Ethernet switch device receives a packet containing a MAC address from a certain port, the Ethernet switch device records the relationship between the port and the MAC address. Such a process is referred to as "MAC address learning". When a packet is being forwarded by the Ethernet switch device, it will broadcast the packet to all the ports if the MAC address of this packet does not exist in the MAC table. When the destination host of the packet feedback packets from a certain port, the Ethernet switch device then identifies this port corresponding to this MAC address and then adds, to the MAC table, an entry containing the corresponding relationship between the MAC address and the port. Such a process is also referred to as "MAC address learning".

Trustable State

In the embodiment, after the Ethernet switch device learns a MAC address, if the corresponding relationship between the MAC address and the port is maintained for a certain period of time and then packets are forwarded according to this MAC table entry, then this MAC table entry is considered as being in a "trustable state", and the certain period of time is referred to as "confidence time". When the port corresponding to the MAC address changes due to MAC address learning, the MAC table entry is considered as being in a "non-trustable state" during the "confidence time".

Figure 3:
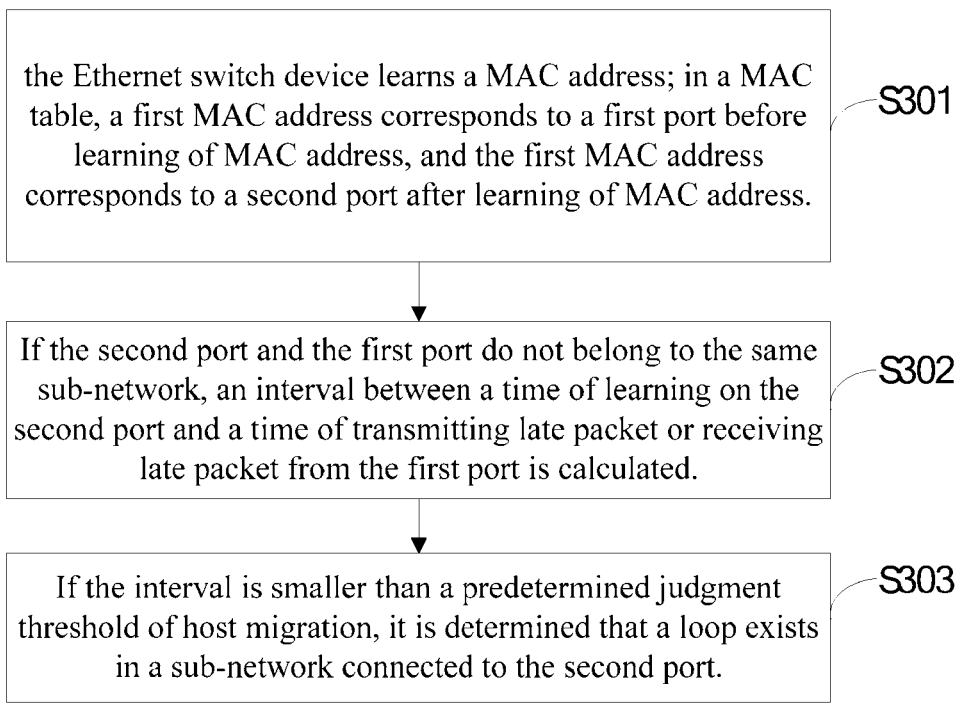
FIG. 3 schematically shows a flow chart of a method for detecting a loop position in an Ethernet as provided by an embodiment of the present application.

In the following, a method for detecting a loop position in an Ethernet as provided by the embodiment of the application will be described with reference to an example of FIG. 3.

S301: the Ethernet switch device learns a MAC address; in a MAC table, a first MAC address corresponds to a first port before the learning of MAC address, and the first MAC address corresponds to a second port after the learning of MAC address.

S302: if the second port and the first port are not in the same sub-network, an interval between a time of learning on the second port and a time of transmitting a last packet or receiving a last packet from the first port is calculated.

S303: if the interval is smaller than a predetermined judgment threshold of host migration, it is determined that a loop exists in a sub-network connected to the second port.

In a real network, especially in a non-mobile network, if a host migrates, the traffic or communication related to this host generally interrupts for at least a second level, that is, the interval between the time of learning on the second port and a time of transmitting a last packet or receiving a last packet from the first port is at a second level. While a loop exists, the time interval is normally below 50 ms. Therefore, whether the port change in the MAC table entries is caused by the loop in the network may be determined by setting a reasonable judgment threshold of host migration.

In particular, when it is determined that there is no "host migration" in the network, the "judgment threshold of host migration" may be set to 0. In this case, once the learning of MAC address is performed, if the second port and the first port are not in the same sub-network, it may be immediately determined that a loop exists in a sub-network connected to the second port.

According to the method for detecting the loop position in Ethernet, as provided by the embodiment of the present application, after learning the MAC address, if the second port and the first port corresponding to the same MAC address are not in the same sub-network, the interval between the time of learning on the second port and the time of forwarding a late packet from the first port is calculated. If the interval is smaller than the judgment threshold of host migration, it is determined that a loop exists in a sub-network connected to the second port. In this way, the time for loop detection in Ethernet can be significantly reduced; and the loop position can be rapidly determined, thereby reducing the impact of the loop on regular traffic to the minimum extent.

A method for detecting a loop position in Ethernet, as provided by another embodiment of the present application will be described in the following with reference to FIG. 4.

S401: the Ethernet switch device learns a MAC address; in a MAC table, a first MAC address corresponds to a first port before the learning of MAC address, and the first MAC address corresponds to a second port after the learning of MAC address.

Figure 4:
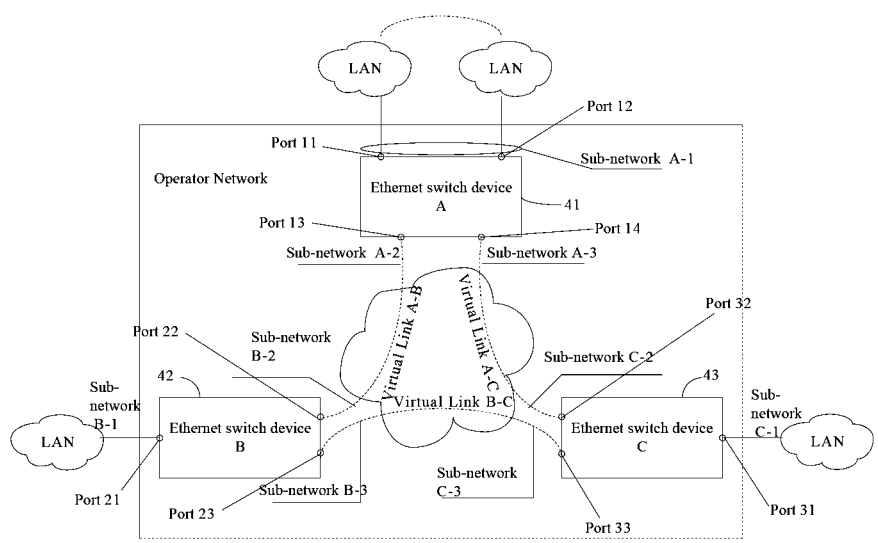
FIG. 4 shows another networking scheme of Ethernet switch devices.

In FIG. 4, it is empirically determined that a loop may exist in local networks connected to the port 11 and to the port 12 of the Ethernet switch device A 41, the ports 11 and 12 therefore belong to one "loop port set" and a network formed by various devices connected to the ports 11 and 12 is a "sub-network A-1". The port 13 of the Ethernet switch device A 41 is connected to a remote client network. It is an empirical determination that a client network may not form a loop with other networks; thus the port 13 belongs to a "loop port set" and the network connected to the port 13 is a "sub-network A-2". Similarly, the port 14 belongs to a "loop port set" and the network connected to the port 14 is a "sub-network A-3".

Similarly, the port 21 of the Ethernet switch device B 42 belongs to a "loop port set" and the network connected to the port 21 is a "sub-network B-1; the port 22 belongs to a "loop port set" and the network connected to the port 22 is a "sub-network B-2"; the port 23 belongs to a "loop port set" and the network connected to the port 23 is a "sub-network B-3".

The port 31 of the Ethernet switch device C 43 belongs to a "loop port set" and the network connected to the port 31 is a "sub-network C-1; the port 32 belongs to a "loop port set" and the network connected to the port 32 is a "sub-network C-2; the port 33 belongs to a "loop port set" and the network connected to the port 33 is a "sub-network C-3".

It is noted that the port as stated herein is not limited to a concrete port, and it may be any interface which implements interconnection between switch devices, such as logical interfaces of a ULAN, a tunnel and the like.

In an example of the MAC table of the Ethernet switch device A 41, the MAC table may contain the following entry which is in "trustable state", as listed in Table 1.

TABLE 1

| MAC address | Port | Trustable state | Learnt time | Latest forwarding time |
|---|---|---|---|---|
| 00-25-BB-BB-BB-01 | Port 13 | TRUE | T1 | T2 |

S402: if the second port and the first port are not in the same sub-network, an interval between a time of learning on the second port and a time of transmitting a last packet or receiving a last packet from the first port is calculated. As an example, it is assumed that the Ethernet switch device A 41 performs a MAC address learning at time T3, and the port corresponding to the MAC address "00-25-BB-BB-BB-01" changes from the port 13 (a first port) to the port 11 (a second port); and the MAC table of the Ethernet switch device A 41 is in a "non-trustable state".

In the example, the port 13 (connected to the sub-network A-2) and the port 11 (connected to the sub-network A-1) are not in the same sub-network. Thus, the interval |T3−T2| between the time T3 of learning on the port 11 and the time T2 of transmitting a last packet or receiving a last packet from the port 13 is calculated.

S403: if the interval calculated at S402 is smaller than a predetermined judgment threshold of host migration, it is determined that a loop exists in the sub-network A-1 connected to the port 11.

In the embodiment of the present application, the setting of the judgment threshold of host migration is not limited in any way, and may be determined according to situations of an actual network.

According to the method for detecting a loop position in Ethernet, as provided by the embodiment of the present application, if the second port and the first port which correspond to the same MAC address are not in the same sub-network after learning the MAC address, the interval between the time of learning on the second port and the time of forwarding a late packet from the first port is calculated. If the interval is smaller than the judgment threshold of host migration, it is determined that the loop exists in a sub-network connected to the second port. In this way, the time for loop detection in Ethernet can be significantly reduced and the position of loop can be rapidly determined, thereby reducing the influence of the loop on regular traffic to the minimum extent.

Optionally, in the embodiment of the present application, after determining the existence of the loop in the sub-network connected to the second port, the Ethernet switch device may also generate an alarm to inform a network administrator.

For example, the method of the embodiment may further comprise the following step after S403:

S404: the Ethernet switch device A 41 generates an alarm to inform a network administrator of the existence of the loop in the sub-network A-1 connected to the port 11. For example, the alarm may be represented by sound, light and the like, so that the network administrator can rapidly find the problem and perform technical diagnose.

Optionally, in the embodiment of the present application, after determining the existence of the loop in the sub-network connected to the second port, the sub-network connected to the second port may also be isolated to prohibit receiving or transmitting a packet from/to the sub-network connected to the second port.

This optional solution may naturally be combined with the above solution of generating the alarm, so that the impact of the loop on the network can be confined to the minimum extent. In the example, the method may further include the following step after step S403 or S404:

S405: receiving packets from the ports 11 and 12 of the sub-network A-1 is blocked; and transmitting packets to the ports 11 and 12 of the sub-network A-1 is blocked.

As an example, after the network administrator finishes handling of a fault, the isolation of the sub-network connected to the second port may be relieved and receiving or transmitting packets to/from the sub-network connected to the second port may be recovered.

Optionally, in the embodiment of the present application, after determining the existence of the loop in the sub-network connected to the second port, a recovery instruction may also be transmitted to instruct the Ethernet switch device receiving the recovery instruction to recover the MAC table.

As an example, the method of the embodiment may further include the following step after S403.

S406: the Ethernet switch device A 41 transmits a recovery instruction; upon receiving the recovery instruction, the Ethernet switch devices B 42 and C 43 restore the changed corresponding relationship between MAC addresses and ports, which are recorded in their MAC tables, to the corresponding relationship as recorded before the loop exists in the sub-network connected to the second port.

After the loop exists in the sub-network connected to the second port, the Ethernet switch device A 41 may incorrectly forward some packets to other Ethernet switch devices, which make other Ethernet switch devices performing incorrect learning for MAC addresses. Thus, after determining the existence of the loop in the sub-network connected to the second port, the Ethernet switch device A 41 transmits a recovery instruction to other Ethernet switch devices on its own initiative, so that the MAC tables of other Ethernet switch devices can be recovered to the corresponding relationship as recorded before the loop exists, and the influence of the loop on the network can be reduced to a certain extent.

Preferably, in the embodiment, the recovery instruction may be transmitted within the confidence time, so that MAC tables of other Ethernet switch devices can be rapidly recovered. Moreover, since it takes place within the confidence time, it may be deduced in terms of probability that the corresponding relationship between MAC addresses and ports in MAC tables of other Ethernet switch devices are changed due to the loop.

Preferably, in the embodiment, the recovery instruction may be transmitted by the manner of broadcast, multicast or unicast; and these manners are illustrative, not limited. In particular, if, after a loop exists, the sub-network containing the loop is isolated or the alarm is generated, then the recovery instruction may be transmitted after the isolation or the generation of the alarm. For example, S406 may be executed after S403, or after S404, or after S405.

Of course, it can be understood that the Ethernet switch device A 41 may receive a recovery instruction transmitted by other Ethernet switch devices and recover the MAC, and the details are not elaborated here.

Figure 5:
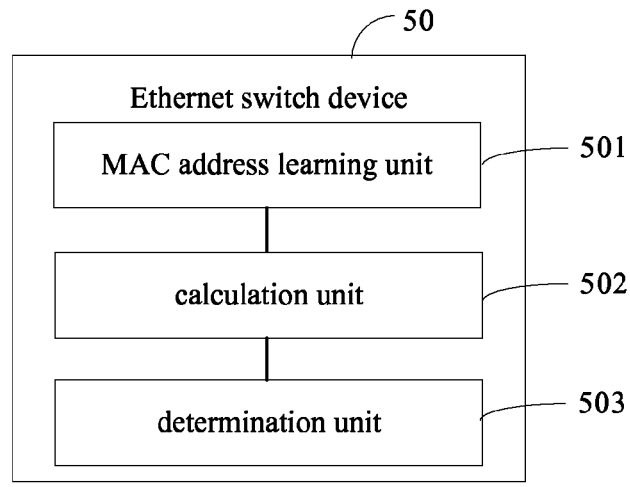
FIG. 5 shows a structure of an Ethernet switch device for detecting a loop position in an Ethernet as provided by an embodiment of the present application.

An Ethernet switch device 50 as provided by an embodiment of the present application is illustrated in FIG. 5, and includes:
  a MAC address learning unit 501, configured to learn a media access control MAC address; in a MAC table, a first MAC address corresponds to a first port before the learning of MAC address, and the first MAC address corresponds to a second port after the learning of MAC address;
  a calculation unit 502, configured to calculate an interval between a time of learning on the second port and a time of transmitting a last packet or receiving a last packet from the first port, if the second port and the first port are not in the same sub-network; and
  a determination unit 503, configured to determine that a loop exists in a sub-network connected to the second port, if the interval is smaller than a predetermined judgment threshold of host migration.

According to the Ethernet switch device as provided by the embodiment of the present application, if the second port and the first port which correspond to the same MAC address are not in the same sub-network after the learning of MAC address, the interval between the time of learning on the second port and the time of forwarding a last packet from the first port is calculated; if the interval is smaller than the judgment threshold of host migration, it is determined that the loop exists in a sub-network connected to the second port. In this way, the time for loop detection in Ethernet can be significantly reduced and the loop position can be rapidly determined, thereby controlling the impact of the loop on regular traffic within the minimum extent.

Figure 6A:
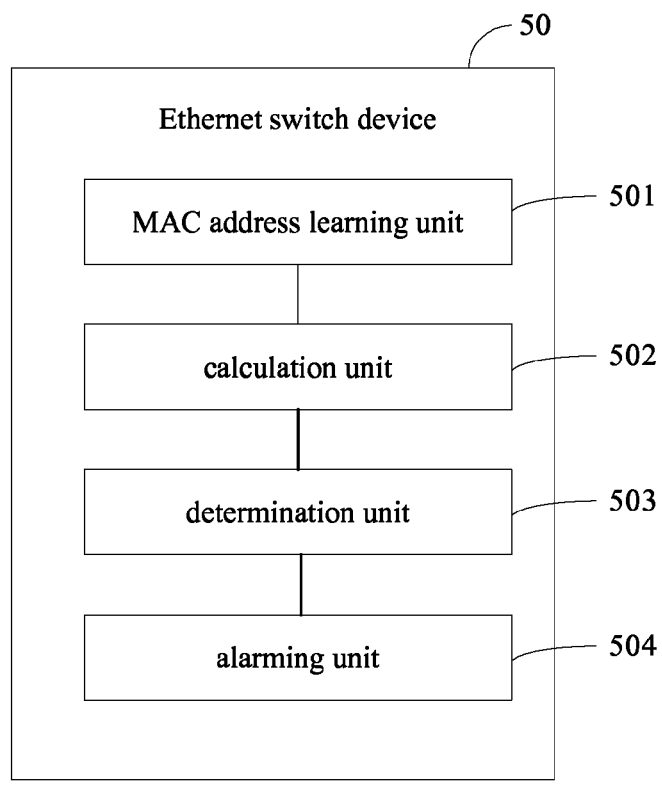
FIG. 6a schematically shows a structure of an Ethernet switch device as provided by another embodiment of the present application.

Optionally, as illustrated in FIG. 6a, the Ethernet switch device 50 may further include:
  an alarming unit 504, configured to generate an alarm to inform a network administrator of the existence of the loop in the sub-network connected to the second port, after determining that the loop exists in the sub-network connected to the second port.

Figure 6B:
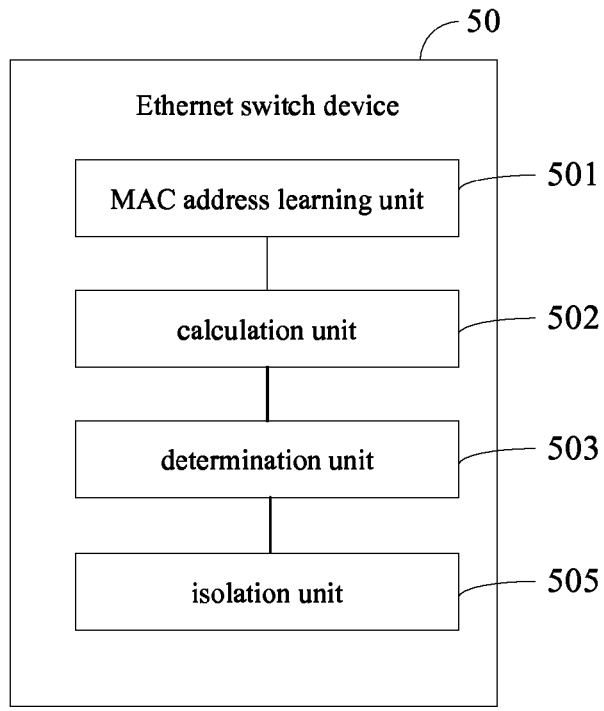
FIG. 6b schematically shows a structure of an Ethernet switch device as provided by further embodiment of the present application.

Optionally, as illustrated in FIG. 6b, the Ethernet switch device 50 may further include:
  an isolation unit 505, configured to isolate the sub-network connected to the second port to prohibit receiving or transmitting packets from/to the sub-network connected to the second port, after determining that the loop exists in the sub-network connected to the second port.

Figure 7:
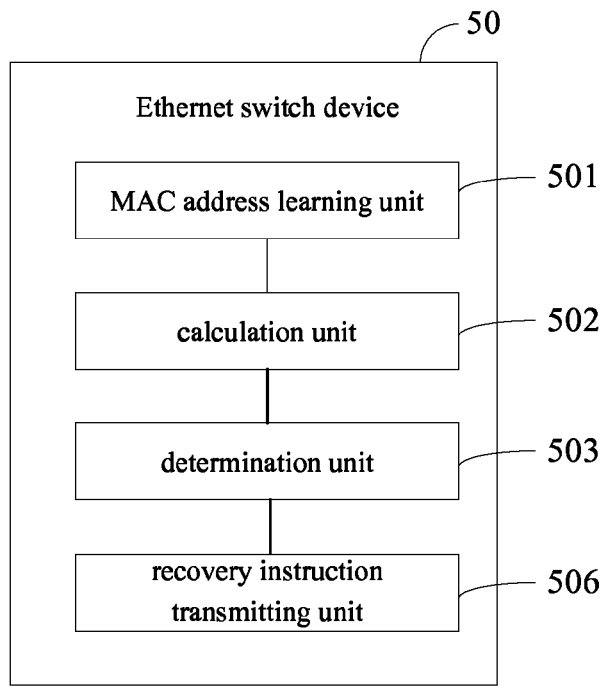
FIG. 7 schematically shows a structure of an Ethernet switch device as provided by still further embodiment of the present application.

Optionally, as illustrated in FIG. 7, the Ethernet switch device 50 may further include:
  a recovery instruction transmitting unit 506, configured to transmit a recovery instruction to instruct the Ethernet switch device receiving the recovery instruction to recover the MAC table, when determining that the loop exists in the sub-network connected to the second port.

Figure 8:
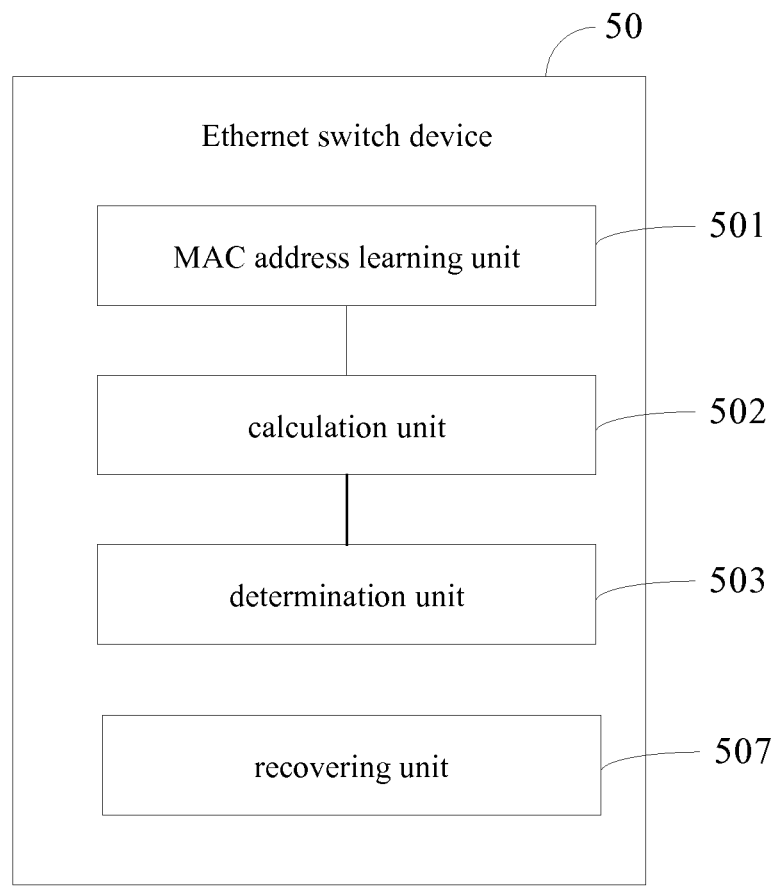
FIG. 8 schematically shows a structure of an Ethernet switch device as provided by still further embodiment of the present invention.

Optionally, as illustrated in FIG. 8, the Ethernet switch device 50 may further include:
  a recovering unit 507, configured to receive a recovery instruction transmitted by other Ethernet switch device and recover the MAC table of the Ethernet switch device 50.

It can be understood by those skilled in the art that a part or all of the steps in the method embodiments may be implemented by hardware associated with computer programs or instructions. The programs may be stored on a computer readable storage medium and may be executed to perform the steps of the method embodiments described above. The storage medium may be a media capable of storing program codes, such as a magnetic disk, an optical disk, a ROM or a RAM.

What are described above is merely detailed embodiments of the present application and not limitative to the scope of the present application. Those skilled in the art can easily conceive modifications and equivalent replacements to the described technical solutions without departing from the scope of the present application, which should be interpreted by the claims.

What is claimed is:

1. A method for detecting a loop position in an Ethernet network, the method comprising:
  learning, by an Ethernet switch device, a Media Access Control (MAC) address, wherein in a MAC table, a first MAC address corresponds to a first port before the learning of the MAC address, and the first MAC address corresponds to a second port after the learning of the MAC address;
  calculating an interval between a time of learning on the second port and a time of transmitting a last packet or receiving a last packet from the first port, if the second port and the first port are not in the same sub-network; and
  determining that a loop exists in a sub-network connected to the second port, if the interval is smaller than a predetermined judgment threshold of host migration.

2. The method of claim 1, after the determining that the loop exists in the sub-network connected to the second port, further comprising:
  generating an alarm to inform a network administrator of existence of the loop in the sub-network connected to the second port.

3. The method of claim 1, after the determining that the loop exists in the sub-network connected to the second port, further comprising:

isolating the sub-network connected to the second port, to prohibit receiving packets from or transmitting packets to the sub-network connected to the second port.

4. The method of claim 1, after the determining that the loop exists in the sub-network connected to the second port, further comprising:

transmitting a recovery instruction that instructs an Ethernet switch device receiving the recovery instruction to recover the MAC table.

5. An Ethernet switch device for detecting a loop position in an Ethernet network, comprising:

a media access control (MAC) address leaning unit, configured to learn a MAC address, wherein in a MAC table, a first MAC address corresponds to a first port before the learning of the MAC address, and the first MAC address corresponds to a second port after the learning of the MAC address;

a calculation unit, configured to calculate an interval between a time of learning on the second port and a time of transmitting a last packet or receiving a last packet from the first port, if the second port and the first port are not in the same sub-network; and a determination unit, configured to determine that a loop exists in a sub-network connected to the second port, if the interval is smaller than a predetermined judgment threshold of host migration.

6. The Ethernet switch device of claim 5, further comprising:

an alarming unit, configured to generate an alarm to inform a network administrator of existence of the loop in the sub-network connected to the second port.

7. The Ethernet switch device of claim 5, further comprising:

an isolation unit, configured to isolate the sub-network connected to the second port to prohibit receiving a packet from or transmitting a packet to the sub-network connected to the second port.

8. The Ethernet switch device of claim 5, further comprising:

a recovery instruction transmitting unit, configured to transmit a recovery instruction that instructs an Ethernet switch device receiving the recovery instruction to recover the MAC table.

9. The Ethernet switch device of claim 5, further comprising:

a recovering unit, configured to receive a recovery instruction transmitted by a second Ethernet switch device and recover the MAC table for the Ethernet switch device detecting the loop position in the Ethernet.

* * * * *